Aug. 29, 1950 — A. G. SACHS — 2,520,437
ORNAMENTAL GLASS FOR PICTURE AND MIRROR MOUNTINGS
Filed Jan. 12, 1946

Patented Aug. 29, 1950

2,520,437

UNITED STATES PATENT OFFICE 2,520,437

ORNAMENTAL GLASS FOR PICTURE AND MIRROR MOUNTINGS

Albert George Sachs, South Yarra, Victoria, Australia

Application January 12, 1946, Serial No. 640,719½
In Australia November 4, 1944

Section 1, Public Law 690, August 8, 1946
Patent expires November 4, 1964

4 Claims. (Cl. 41—22)

This invention relates to mountings for pictures, paintings, engravings, photographs, mirrors and the like, hereinafter referred to in general as "pictures." It is commonly known to provide a scalloped formation around the marginal edges of mirrors. This formation is created by the breaking out of small, half-round pieces around the border of the mirror or glass to be silvered. These pieces possess the shape of a conic section, the base appearing at the front of the mirror while the arcuate edge forms a circular arc towards the centre of the mirror. The height of the segment is equal to the thickness of the glass, while the length of the chord varies.

As might be expected, by taking such a scalloped-edge-glass mirror, from which the silvering has been removed, except for a narrow marginal strip, and by placing the picture at the rear of the glass, the picture will be displayed inside a silvered scalloped frame. A drawback however is created by the slow and laborious task of removing the silver from the back of the mirror, except for the narrow strip, which furthermore would require to be perfectly straight or otherwise true to shape. An even greater difficulty would arise, should the silvering be applied to the above named strip only.

In the course of experiments I have now discovered, that surprisingly better results are obtained, by arranging for the reflecting surface around the picture to be disposed rearwardly of the plane of the peaks of the scallops of the glass cover instead of flush or substantially flush therewith as before referred to.

A reflecting surface within the meaning of this specification may either be silvered glass or any bright or shining material of the desired color or tone, such as tin foil.

It is furthermore known, to create a depth effect of irregular reflection by combining a transparent front element of uneven surface with a reflecting rear element. Such front element however is not suited to be used as a picture cover or mirror, because a picture cover or mirror must possess an even surface to avoid distortions. This difficulty can be overcome by taking a front element possessing the qualities needed for a picture cover or mirror and restricting the area of unevenness desired for framing purposes by creating it along the edges only, by the simple and quick process of scalloping in the manner described above. All other means so far known and used to create a front element of uneven face structure for the purpose of depth effect in connection with a reflective backing member, would, when applied to the edges of the front element only, not leave its centre unaffected, or encounter great technical difficulties or involve a slow and laborious task. It would also be difficult and expensive to cast such a pane of glass.

Referring to the drawings.

Figure 1:
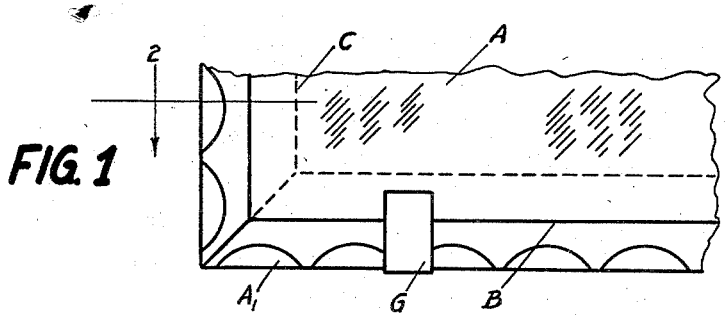
Figure 1 is a front view of the lower left hand corner of an upright standing or hanging picture sandwiched between a scalloped transparent glass front and a wooden or like back, having strips of silvered glass or like reflective material fitted along the edges.
Figure 2:
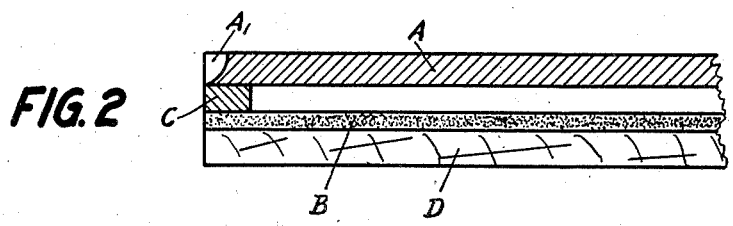
Figure 2 is a sectional view on line 2 of Figure 1.

Referring firstly to Figures 1 and 2, A indicates a pane of glass, provided with a scalloped formation A1 around its marginal edges. B indicates a picture, C strips of silvered glass or other suitable reflecting material. Metal or other suitable clips G may be disposed at suitable intervals to retain the parts in their assembled condition.

Figure 3:
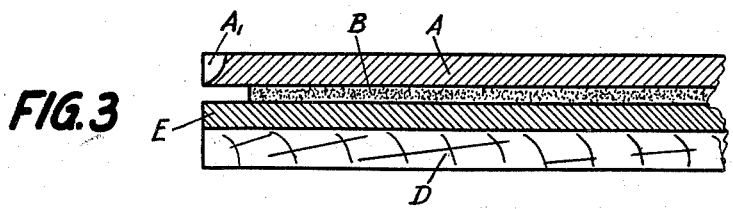
Figure 3 is a sectional view, illustrating another form of the invention.

In Figure 3, A represents a front pane of glass having a scalloped edge A1, E represents a pane of silvered glass or reflective material as a rear element and B represents a picture sandwiched between A and E. D is a backing member in both Figs. 2 and 3.

In Figs. 1, 2 and 3 the outer edges of the front pane A coincide with the outer edges of the backing member D and the outer edges of the strips C or the pane E. The picture B appears surrounded by a frame, the inner edges of which are formed either by the inner edges of the strips C, as in Figs. 1 and 2, or by the outer edges of the picture, as in Fig. 3.

Thus according to one embodiment, I employ two panels of glass of equal size and shape. The front panel is transparent and nonreflective, but has its marginal edge or edges scalloped. The second or rear glass panel is silvered or similarly treated. Thereby light reflected from the silvered edge or edges of the rear glass panel plays upon the scalloped edge or edges of the front panel, while these scalloped formations are again reflected in the mirror behind. This effect cannot be created by employing a single sheet of glass, scalloped and silvered.

When a picture of slightly less overall dimensions than the two glass panels is sandwiched between these two panels, thus arranging for the reflecting surface around the picture to be disposed rearwardly of the peaks of the scallops of the glass cover, the reflecting effect of the edges is surprisingly improved and a frame-like border produced.

Furthermore the abovementioned difficulty in creating a straight or accurately shaped edge of the frame-like silver surrounding is removed, as no difficulty arises in providing the picture itself with perfectly straight or accurately shaped edges.

The full sized pane of silvered glass may be replaced by the assemblage in a miter or otherwise of relatively narrow strips of silvered glass, to form an edging or border of the requisite shape.

According to a further alternative, instead of employing mirrored glass as reflective element for the full sized pane or the strips, I may utilize metal foil, such as tin foil, silver foil or any other bright and shining material of any desired colour or tone.

As to the application of this invention to the mounting of mirrors, the mirror itself shall have its edge portion left unsilvered or have the silver removed therefrom and thus possess scalloped and transparent edges, while the reflective rear element placed behind the mirror will be visible through the transparent edge portions and be reflected in their scallops, thus forming a frame round the mirror.

I claim:

1. An ornamental mounting for pictures, comprising a plane pane of transparent material as front element, the edges of which pane are scalloped, that is to say, they possess a row of hollows of the shape of conical sections, a rear element of reflective material covering the area of the scalloped edges of the front element and a picture situated behind the front element and within the frame formed by the scalloped edge of the front element.

2. An ornamental mounting for pictures, comprising a plane pane of transparent material as front element, the edges of which are scalloped, that is to say, they possess a row of hollows of the shape of conical sections, a rear element of reflective material of the same size and shape as the front element and a picture of a smaller overall size than the front element sandwiched between the front and the rear elements.

3. An ornamental mounting for pictures, comprising a plane pane of transparent material as front element, the edges of which pane are scalloped, that is to say, they possess a row of hollows of the shape of conical sections, a rear element consisting of strips of reflective material situated longitudinally underneath the scalloped edges of the front element and a picture situated behind the front element and surrounded by the strips forming the rear element.

4. An ornamental mounting for mirrors, comprising a plane pane of transparent material as front element, the edges of which pane are scalloped, that is to say, they possess a row of hollows of the shape of conical sections and which transparent pane is made reflective except for its scalloped edge portions and a rear element of reflective material covering the area of the scalloped edge of the front element.

ALBERT GEORGE SACHS.

REFERENCES CITED

The following references are of record in the file of this patent:

UNITED STATES PATENTS

| Number | Name | Date |
|---|---|---|
| 370,133 | Egginton | Sept. 20, 1887 |
| 392,935 | Smith | Nov. 13, 1888 |
| 608,356 | Wellwood | Aug. 2, 1898 |
| 878,680 | Snell | Feb. 11, 1908 |
| 1,032,515 | Sterrick | July 16, 1912 |
| 2,149,171 | Grote | Feb. 28, 1939 |
| 2,186,643 | Kaplan | Jan. 9, 1940 |
| 2,401,495 | Martin | June 4, 1946 |